United States Patent [19]

Majer et al.

[11] 4,324,732
[45] Apr. 13, 1982

[54] PROCESS FOR THE PREPARATION OF MONOAROYLATED 1,4-DIAMINOANTHRAQUINONES

[75] Inventors: Norbert Majer, Berg.-Gladb.; Günther Boehmke, Leverkusen, both of Fed. Rep. of Germany

[73] Assignee: Bayer Aktiengesellschaft, Leverkusen, Fed. Rep. of Germany

[21] Appl. No.: 184,569

[22] Filed: Sep. 5, 1980

[30] Foreign Application Priority Data

Sep. 19, 1979 [DE] Fed. Rep. of Germany ....... 2937876

[51] Int. Cl.$^3$ .......................................... C07C 143/665
[52] U.S. Cl. ................................... 260/377; 260/374; 260/378
[58] Field of Search ......................... 260/377, 374, 378

[56] References Cited

U.S. PATENT DOCUMENTS

| | | | |
|---|---|---|---|
| 1,867,058 | 7/1932 | Buchloh et al. | 260/377 |
| 2,129,991 | 9/1938 | Deinet | 260/377 |
| 3,651,099 | 3/1972 | Perlinger et al. | 260/377 |

FOREIGN PATENT DOCUMENTS 2132394 1/1973 Fed. Rep. of Germany ...... 260/377

*Primary Examiner*—Winston A. Douglas
*Assistant Examiner*—Raymond K. Covington
*Attorney, Agent, or Firm*—Sprung, Felfe, Horn, Lynch & Kramer

[57] ABSTRACT

In a process for the preparation of monoaroylated 1,4-diaminoanthraquinone by contacting 1,4-diaminoanthraquinone with an aroyl halide in the presence of an organic solvent and an acid-binding agent and in the presence of a small amount of water at an elevated temperature, the improvement which comprises carrying out the process in the presence of a tertiary aliphatic aminoalcohol and/or quaternary ammonium compound and commencing the reaction at a temperature of 20° to 50° C. and, after addition of the aroyl halide, completing the reaction at a temperature of 80° to 130° C.

8 Claims, No Drawings

PROCESS FOR THE PREPARATION OF MONOAROYLATED 1,4-DIAMINOANTHRAQUINONES

The invention relates to a process for the preparation of monoaroylated 1,4-diaminoanthraquinones by reacting 1,4-diaminoanthraquinones with aroyl halides.

It is known that 4-amino-1-benzoylaminoanthraquinone can be prepared by reacting 1,4-diaminoanthraquinone with benzoyl chloride in the presence of nitrobenzene and acid-binding agents (Ullmanns Encyklopädie der technischen Chemie (Ullmann's Encyclopaedia of Industrial Chemistry), 4th edition, volume 7, page 596 (1973), U.S. Pat. No. 1,867,057 (Example 1), Bios Final Report 1484, pages 4 and 5, and Houben-Weyl, Methoden der organischen Chemie (Methods of Organic Chemistry), 4th edition, volume VI 3c, page 216 (1979)).

In this process, the leuco-1,4-aminoanthraquinone used is first oxidized in nitrobenzene in the presence of piperidine or collidine at temperatures of about 150° C., considerable amounts of aniline being formed as a by-product. During the subsequent benzoylation reaction, benzanilide is formed from the aniline and must be separated off from the desired 1-amino-4-benzoylaminoanthraquinone by expensive separation operations, because benzanilide interferes in the further reaction of monoaroylated 1,4-diaminoanthraquinones to give, for example, dyestuffs.

A further disadvantage is that relatively large amounts of bisaroylation products of 1,4-diaminoanthraquinone are formed during the aroylation of 1,4-diaminoanthraquinone, and these have an adverse effect on further processing of the monoaroylated 1,4-diaminoanthraquinone to give dyestuffs.

A process has now been found for the preparation of monoaroylated 1,4-diaminoanthraquinones by reacting a 1,4-diaminoanthraquinone with an aroyl halide in the presence of an organic solvent and an acid-binding agent and in the presence of a small amount of water at elevated temperature, which is characterized in that the reaction is carried out in the presence of a tertiary aliphatic aminoalcohol and/or quaternary ammonium compound and is first started at about 20° to about 50° C. and, after addition of the aroyl halide, is brought to completion at about 80° to about 130° C.

Tertiary aliphatic aminoalcohols which can be used in the process according to the invention are those of the general formula I

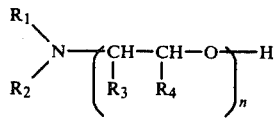

in which
  $R_1$ and $R_2$ are identical or different and represent an optionally substituted alkyl radical,
  $R_3$ and $R_4$ are identical or different and represent hydrogen or an optionally substituted alkyl radical and
  n denotes an integer from 1 to 3.

Possible optionally substituted alkyl radicals $R_1$ to $R_4$ are those with up to 4 C atoms, preferably up to 3 C atoms, such as methyl, ethyl, n-propyl, isopropyl, n-butyl, iso-butyl, tert.-butyl, 2-hydroxyethyl, 2-hydroxypropyl and 2-hydroxybutyl, preferably methyl, 2-hydroxyethyl and 2-hydroxypropyl. Substituents on the alkyl group include: hydroxyl, alkoxyl, cyano, ether etc.

Examples of tertiary aliphatic aminoalcohols which may be mentioned are: dimethylaminoethanol, methyldiethanolamine, diethylaminoethanol, ethyldiethanolamine, dipropylaminoethanol, propyldiethanolamine, dibutylaminoethanol, butyldiethanolamine, dimethyl-, diethyl-, dipropyl- and dibutyl-aminoisopropanol, methyl-, ethyl-, propyl- and butyl-diisopropanolamine, dimethyl-, diethyl-, dipropyl- and dibutyl-aminoisobutanol, methyl-, ethyl-, propyl- and butyl-diisobutanolamine, triethanolamine, triisopropanolamine and dimethylaminoethyl hydroxyethyl ether, preferably methyldiisopropanolamine, triisopropanolamine, butyldiethanolamine and dimethylaminoethyl hydroxyethyl ether.

It is, of course, also possible to employ the tertiary aliphatic aminoalcohols in the form of their salts, such as the hydrochlorides, sulphates, phosphates or acetates.

Quaternary ammonium compounds which can be used in the process according to the invention are those of the general formula II

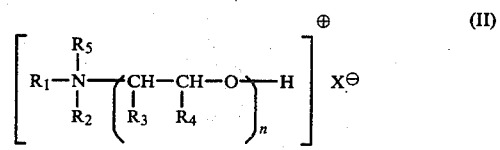

in which
  $R_1$, $R_2$, $R_3$, $R_4$ and $R_5$ are identical or different and have the meaning indicated for $R_1$ to $R_4$ under formula (I) and
  $X^\ominus$ represents a halide, cyanide, hydrosulphate, hydrogen phosphate or hydroxyl ion.

Halide ions which may be mentioned are: the fluoride, chloride and bromide ion, preferably the chloride ion.

The following are mentioned as examples of quaternary ammonium compounds: trimethylethanolammonium hydroxide, trimethylethanolammonium hydroxide, trimethylisopropanolammonium hydroxide, triethylisopropanolammonium hydroxide, dimethyldiethanolammonium hydroxide, methyltriethanolammonium hydroxide, ethyltriethanolammonium hydroxide, ethyltriethanolammonium hydroxide, propyltriethanolammonium hydroxide, butyltriethanolammonium hydroxide, trimethylisobutanolammonium hydroxide and tetra-hydroxyethanolammoniumhydroxide.

Trimethylethanolammonium hydroxide and trimethylisopropanolammonium hydroxide may be mentioned as preferred.

The tertiary aliphatic aminoalcohols and/or quaternary ammonium compounds can be used in amounts of about 0.01 to about 5% by weight, preferably 0.1 to 1% by weight, relative to the 1,4-diaminoanthraquinone.

The tertiary aliphatic aminoalcohols and/or quaternary ammonium compounds can be added to the reaction mixture in the form of solids or as aqueous solutions or suspensions.

1,4-Diaminoanthraquinones which can be used in the process according to the invention are those of the general formula III

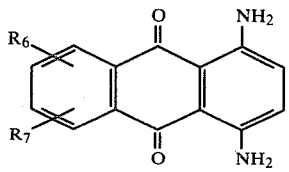

(III)

in which $R_6$ and $R_7$ are identical or different and represent hydrogen, halogen or a hydroxyl, nitro, acylamino, alkyl, alkoxy or phenoxy group.

Halogens which may be mentioned are, for example: fluorine, chlorine and bromine, preferably chlorine.

Acylamino radicals which may be mentioned are those with up to 6 C atoms, preferably up to 2 C atoms, such as acetylamino, propionylamino, butyrylamino and benzoylamino, preferably acetylamino; alkyl radicals which may be mentioned are those with up to 10 C atoms, preferably up to 4 C atoms, such as methyl, ethyl, n-propyl, isopropyl, n-butyl, isobutyl, tert.-butyl, n-pentyl, iso-pentyl, n-octyl and iso-octyl, preferably methyl, ethyl, n-propyl and n-butyl; aryl radicals which may be mentioned are those with up to 10 C atoms, preferably up to 6 C atoms, such as phenyl and naphthyl, preferably phenyl; alkoxy radicals which may be mentioned are those with up to 4 C atoms, preferably up to 3 C atoms, such as methoxy, ethoxy and propoxy, preferably methoxy; and phenoxy radicals which may be mentioned are those with up to 10 C atoms, preferably up to 6 C atoms, such as phenoxy and methylphenoxy, preferably phenoxy.

The following 1,4-diaminoanthraquinones, for example, can be used in the process according to the invention: 1,4-diaminoanthraquinone, 1,4-diamino-5-chloroanthraquinone, 1,4-diamino-6-chloroanthraquinone, 1,4-diamino-7-chloroanthraquinone, 1,4-diamino-8-chloroanthraquinone, 1,4-diamino-6,7-dichloroanthraquinone, 1,4-diamino-6,7-dimethoxyanthraquinone, 1,4-diamino-5,8-dimethoxyanthraquinone, 1,4-diamino-5-nitroanthraquinone, 1,4-diamino-6-nitroanthraquinone, 1,4-diamino-7-nitroanthraquinone, 1,4-diamino-8-nitroanthraquinone, 1,4-diamino-6,7-dinitroanthraquinone and 1,4-diamino-5,8-dinitroanthraquinone, preferably 1,4-diaminoanthraquinone.

Aroyl halides which can be used in the process according to the invention are those of the general formula V

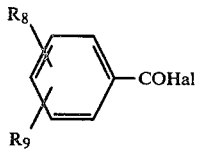

(V)

in which
  $R_8$ and $R_9$ are identical or different and have the meaning indicated for $R_6$ and $R_7$ in the case of formula III and
  Hal represents chlorine or bromine, preferably chlorine.

The following aroyl halides, for example, can be used in the process according to the invention: benzoyl chloride, 2-chlorobenzoyl chloride, 3-chlorobenzoyl chloride, 4-chlorobenzoyl chloride, 2,4-dichlorobenzoyl chloride, 3,5-dichlorobenzoyl chloride, 2-methylbenzoyl chloride, 3-methylbenzoyl chloride, 4-methylbenzoyl chloride, 2,4-dimethylbenzoyl chloride, 3,5-dimethylbenzoyl chloride, 2-methoxybenzoyl chloride, 3-methoxybenzoyl chloride, 4-methoxybenzoyl chloride, 2,4-dimethoxybenzoyl chloride and 3,5-dimethoxybenzoyl chloride, preferably benzoyl chloride, 4-chlorobenzoyl chloride, 4-methylbenzoyl chloride, 4-methoxybenzoyl chloride, 2-chlorobenzoyl chloride and 3-chlorobenzoyl chloride.

The corresponding acid bromides can, of course, also be used.

Acid-binding agents which can be used are: alkali metal carbonates and/or alkaline earth metal carbonates and/or bicarbonates thereof, and alkaline earth metal hydroxides.

Examples which may be mentioned are: sodium carbonate, potassium carbonate, calcium carbonate, sodium bicarbonate, potassium bicarbonate, magnesium oxide, calcium oxide and calcium hydroxide, preferably sodium carbonate.

The acid-binding agents can be used in amounts of about 30 to 60% by weight, preferably 45 to 35% by weight, relative to the corresponding 1,4-diaminoanthraquinone.

Organic solvents which can be used in the process according to the invention are: nitrobenzene, chlorobenzene, xylene, dichlorobenzenes and sulphones, preferably nitrobenzene.

The amounts of organic solvents advantageous for the process according to the invention can easily be determined by preliminary experiments.

The reaction according to the invention can be carried out in a temperature range from about 20° to about 130° C., and preferably at about 30° to 100° C., the reaction being initially started at 20° to 50° C., preferably 30° to 40° C., and, after adding the aroyl halide, being brought to completion at temperatures in the range from about 80° to 130° C., preferably 90° to 100° C.

The reaction is in general carried out under normal pressure. However, one can carry it out under a slightly reduced or increased pressure. For example, the reaction can be carried out under a reduced pressure in the range from 0.5 to 0.7 bar, or under an increased pressure in the range from 1 to 3 bars.

The reaction according to the invention is carried out in the presence of small amounts of water. About 1 to 10% by weight of water, relative to the 1,4-diaminoanthraquinone, is added to the reaction mixture. 3 to 5% by weight of water is preferably added. It is, of course, also possible to obtain the appropriate content of water by using technical grade organic solvents which contain water, or acid-binding agents which contain water.

In a preferred embodiment of the process according to the invention, the reaction is started at about 20° C., the aroyl halide is added at 30°–40° C., the mixture is heated to about 100° C. in the course of 2–4 hours and, after adding last amount of the aroyl halide, the reaction is brought to completion at a temperature of about 100°–130° C. If appropriate, a little more aroyl halide is added to the reaction mixture at this temperature in order to bring the reaction to completion. The reaction has ended as soon as only traces (<0.5%) of the 1,4-diaminoanthraquinone employed can still be detected by chromatography. The reaction is stopped by adding water in order to decompose excess aroyl halide.

The process according to the invention can be carried out either continuously or discontinuously.

The advantage of the process according to the invention is that the reaction is simple to carry out. Expensive purification and separation operations and hence the waste air and effluent problems arising during working up of the mother liquors are eliminated. Only small amounts of organic solvents are needed in the process according to the invention, and the organic solvents distilled off can be re-used for subsequent reactions without further purification.

Moreover, it was exceptionally surprising that the reaction in the process according to the invention could be controlled, by adding tertiary aliphatic aminoalcohols and/or quaternary ammonium compounds, such that only small amounts of undesired by-products formed and the monoaroylated 1,4-diaminoanthraquinone can be reacted, without further purification, to give, for example, vat dyestuffs (Ullmanns Encyklopäie der technischen Chemie (Ullmann's Encyclopaedia of Industrial Chemistry), 4th edition, volume 7, page 622 (1973), and Bios 1493, page 23).

The process according to the invention may be illustrated by the examples which follow, but without being limited to the examples.

EXAMPLE 1

30 g of 91% pure 1,4-diaminoanthraquinone, 14 g of sodium carbonate and 0.2 g of trimethylethanolammonium hydroxide (60% strength aqueous solution) are introduced into 250 ml of nitrobenzene, the components are mixed thoroughly, 0.9 ml of water is added and the mixture is heated to 35° to 40° C. 16 ml of benzoyl chloride are added dropwise in the course of 3 hours, the mixture is then heated to 100° C. in the course of 2 to 3 hours and up to another 6 ml of benzoyl chloride are added in portions. The reaction is ended as soon as, according to the thin layer chromatogram, only traces (<0.5%) of the starting compound can still be detected and traces (<2%) of the bisbenzoylation product have formed. 1 ml of water is now added. The nitrobenzene is then distilled off in vacuo. 65 g of a product (94.5% of theory) containing 58% of 1-amino-4-benzoylaminoanthraquinone, 0.4% of 1,4-diaminoanthraquinone and 1.5% of 1,4-bisbenzoylaminoanthraquinone are obtained. The remainder of the product consists of salts, such as sodium chloride and sodium benzoate.

The resulting product can be used, without further purification, for the preparation of numerous vat dyestuffs (compare, for example, Ullmanns Encyklopädie der technischen Chemie (Ullmann's Encyclopaedia of Industrial Chemistry), 4th edition, volume 7, page 622 (1973) and Bios 1493, page 23).

If a purer quality is required, 65 g of the resulting crude product are stirred in ten times the amount of hot 5% strength hydrochloric acid for 1 hour, filtered off, rinsed with 50 ml of hot 5% strength hydrochloric acid, washed with hot water until neutral and dried.

42.3 g (94% of theory) of a product of the following composition are obtained: 87% of 1-amino-4-benzoylaminoanthraquinone, 2.7% of 1,4-bisbenzoylaminoanthraquinone and 0.8% of 1,4-diaminoanthraquinone.

The remainder of the product consists of inorganic and organic salts.

COMPARISON EXAMPLE 30 g of 1,4-diaminoanthraquinone (91% pure) are reacted with 22 ml of benzoyl chloride in 210 ml of nitrobenzene under the reaction conditions indicated in Example 1. However, in contrast to Example 1, the reaction was not carried out in the presence of trimethylethanolammonium hydroxide.

64.5 g of a product (47% of theory) containing 28.5% of 1-amino-4-benzoylaminoanthraquinone, 0.4% of 1,4-diaminoanthraquinone and 30% of 1,4-bis-benzoylaminoanthraquinone were obtained.

The comparison example shows that, without the addition of trimethylethanolammonium hydroxide, larger amounts of the bisbenzoylation product are formed and only small amounts of the desired 1-amino-4-benzoylaminoanthraquinone are obtained.

Examples 2 to 11 were carried out under the reaction conditions indicated in Example 1 and with the amounts of 1,4-diaminoanthraquinone and nitrobenzene indicated in this example.

| Example | Acid chloride | Amount (ml) | Catalyst | Amount of catalyst (g) | Yield (g) | Bisbenzoylation product (%) |
|---|---|---|---|---|---|---|
| 2 | benzoyl chloride | 22 | (2) | 0.4 | 63.7 | 4 |
| 3 | benzoyl chloride | 22 | (3) | 0.2 | 65.1 | 2 |
| 4 | benzoyl chloride | 21 | (4) | 0.2 | 63.5 | 8 |
| 5 | benzoyl chloride | 21 | (5) | 0.2 | 62.5 | 3 |
| 6 | 2-chlorobenzoyl chloride | 27 | (1) | 0.2 | 67.0 | 4-5 |
| 7 | 3-chlorobenzoyl chloride | 22 | (1) | 0.2 | 65.0 | 3-4 |
| 8 | 4-chlorobenzoyl chloride | 21 | (1) | 0.2 | 67.0 | 3-5 |
| 9 | 3-methylbenzoyl chloride | 20 | (1) | 0.2 | 61.0 | 6-8 |
| 10 | 4-methylbenzoyl chloride | 21 | (1) | 0.2 | 64.0 | 3-5 |
| 11 | 3-methoxybenzoyl chloride | 22 | (1) | 0.2 | 65.0 | 2-5 |

(1) trimethylethanolammonium hydroxide
(2) trimethylethanolammonium chloride
(3) triisopropanolamine
(4) reaction product of ammonia and 6 mols of ethylene oxide in the presence of 1 mol of water
(5) methyltriethanolammonium hydroxide

What is claimed is:

1. In a process for the preparation of monoaroylated 1,4-diaminoanthraquinone by contacting 1,4-diaminoanthraquinone with an aroyl halide in the presence of an organic solvent and an acid-binding agent and in the presence of a small amount of water at an elevated temperature, the improvement which comprises carrying out the process in the presence of a tertiary aliphatic aminoalcohol and/or quaternary ammonium compound by heating a reaction mixture comprising 1,4-diaminoanthraquinone, organic solvent, acid binding agent, a small amount of water and said tertiary aliphatic aminoalcohol and/or quaternary ammonium compound up to a temperature of 20° to 50° C., adding aroyl halide thereto and completing the reaction at a temperature of 80° to 130° C.

2. A process according to claim 1, wherein the process is carried out in the presence of a tertiary aliphatic aminoalcohol.

3. A process according to claim 1, whereinthe process is carried out in the presence of a quaternary ammonium compound.

4. A process according to claim 1, wherein the process is carried out in the presence of a tertiary aliphatic aminoalcohol and said tertiary aliphatic aminoalcohol is one having the formula

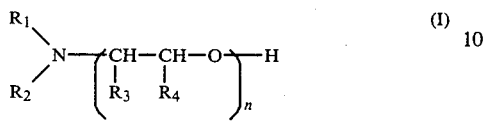

in which
R₁ and R₂ are identical or different and represent an optionally substituted alkyl radical,
R₃ and R₄ are identical or different and represent hydrogen or an optionally substituted alkyl radical and
n denotes an integer from 1 to 3.

5. A process according to claim 4, wherein said tertiary aliphatic aminoalcohol is methyldiisopropanolamie, triisopropanolamine, butyldiethanolamine or dimethylaminoethyl hydroxyethyl ether.

6. A process according to claim 1, wherein the process is carried out in the presence of the quaternary ammonium compound and said quaternary ammonium compound has the formula

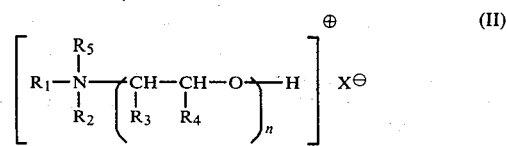

in which
R₁, R₂, R₃, R₄ and R₅ are identical or different and represent hydrogen or an optionally substituted alkyl radical and
X⁻ represents a halide, cyanide, hydrosulphate, hydrogen phosphate or phdroxyl ion.

7. A process according to claim 6, wherein said quaternary ammonium compound is trimethylethanolammonium hydroxide or trimethylisopropanolammonium hydroxide.

8. A process according to claim 1, wherein said tertiary aliphatic aminoalcohol and/or quaternary ammonium compound is employed in an amount of 0.01 to 5% by weight, relative to the 1, 4-diaminoanthraquinone.

* * * * *